(12) United States Patent
Schaich et al.

(10) Patent No.: US 12,305,812 B2
(45) Date of Patent: May 20, 2025

(54) TANK DEVICE FOR STORING A GASEOUS MEDIUM

(71) Applicant: Robert Bosch GmbH, Stuttgart (DE)

(72) Inventors: Udo Schaich, Stuttgart (DE); Andreas Rau, Stuttgart (DE); Marco Stieber, Vaihingen An der Enz (DE); Thomas Schwarz, Schorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 101 days.

(21) Appl. No.: 18/251,753

(22) PCT Filed: Oct. 21, 2021

(86) PCT No.: PCT/EP2021/079160
§ 371 (c)(1),
(2) Date: May 4, 2023

(87) PCT Pub. No.: WO2022/100974
PCT Pub. Date: May 19, 2022

(65) Prior Publication Data
US 2023/0417370 A1    Dec. 28, 2023

(30) Foreign Application Priority Data
Nov. 12, 2020   (DE) .................... 10 2020 214 214.9

(51) Int. Cl.
*F16K 31/40*   (2006.01)
*F17C 13/04*   (2006.01)
*H01M 8/04082* (2016.01)

(52) U.S. Cl.
CPC ............ *F17C 13/04* (2013.01); *F16K 31/408* (2013.01); *H01M 8/04201* (2013.01);
(Continued)

(58) Field of Classification Search
None
See application file for complete search history.

(56) References Cited

U.S. PATENT DOCUMENTS 2,964,286 A   12/1960  Hoskins
3,183,932 A * 5/1965  Karpus, Jr. .......... G05D 7/0635
                                              137/503
(Continued)

FOREIGN PATENT DOCUMENTS

DE   102018201055 A1   7/2019
DE   102018215384 A1   3/2020
(Continued)

OTHER PUBLICATIONS

Translation of International Search Report for Application No. PCT/EP2021/079160 dated Jan. 31, 2022 (2 pages).

*Primary Examiner* — Matthew W Jellett
(74) *Attorney, Agent, or Firm* — Michael Best & Friedrich LLP

(57) ABSTRACT

The invention relates to a tank device (1) for storing a gaseous medium, in particular hydrogen, comprising a valve device (2), and a tank (10) and having a longitudinal axis (11). The valve device (2) has a valve housing (20), which is equipped with a pilot valve element (18) that can be moved along the longitudinal axis (11), said pilot valve element (18) interacting with a first valve seat (27) in order to open and close a first outlet opening (56) and thus forming a pilot valve (44). The valve device (2) can be actuated by means of a solenoid coil (14), wherein a main valve element (19) is arranged in the valve housing (20), said main valve element (19) interacting with a second valve seat (40) in order to open and close a second outlet opening (31) and thus forming a main valve (191). The tank device (1) comprises a screw-in housing element (24), wherein the valve device (2) is integrated into a neck region (6) of the
(Continued)

tank (10) in a fixed manner by means of the screw-in housing element (24). The valve device (2) is arranged in the tank (10) by means of a tank pressure and is in a closed position by means of a spring (26) when the solenoid coil (14) is deactivated.

17 Claims, 1 Drawing Sheet

(52) U.S. Cl.
CPC ............... *F17C 2201/056* (2013.01); *F17C 2205/0305* (2013.01); *F17C 2205/0326* (2013.01); *F17C 2205/0391* (2013.01); *F17C 2221/012* (2013.01); *F17C 2223/0123* (2013.01); *F17C 2223/036* (2013.01); *F17C 2270/0168* (2013.01); *F17C 2270/0184* (2013.01); *H01M 2250/20* (2013.01); *Y10T 137/86332* (2015.04); *Y10T 137/87209* (2015.04); *Y10T 137/87917* (2015.04); *Y10T 137/88046* (2015.04)

(56) References Cited

U.S. PATENT DOCUMENTS

| | | | | | |
|---|---|---|---|---|---|
| 5,188,017 | A | * | 2/1993 | Grant | F17C 13/04 251/129.21 |
| 5,450,876 | A | * | 9/1995 | Reinicke | F16K 31/0675 137/614.19 |
| 6,557,821 | B2 | * | 5/2003 | Girouard | F16K 31/408 251/30.01 |
| 6,675,831 | B2 | * | 1/2004 | Sakaguchi | F17C 1/14 137/613 |
| 8,382,063 | B2 | * | 2/2013 | Watanabe | F16K 31/0655 335/277 |
| 2009/0283165 | A1 | | 11/2009 | Nakata et al. | |
| 2014/0239207 | A1 | | 8/2014 | Ninomiya et al. | |
| 2015/0192213 | A1 | | 7/2015 | Nomichi et al. | |

FOREIGN PATENT DOCUMENTS

| | | |
|---|---|---|
| JP | 2007162763 A | 6/2007 |
| WO | 2005096695 A1 | 10/2005 |
| WO | 2015129159 A1 | 9/2015 |
| WO | 2020120074 A1 | 6/2020 |
| WO | 2021190890 A1 | 9/2021 |

* cited by examiner

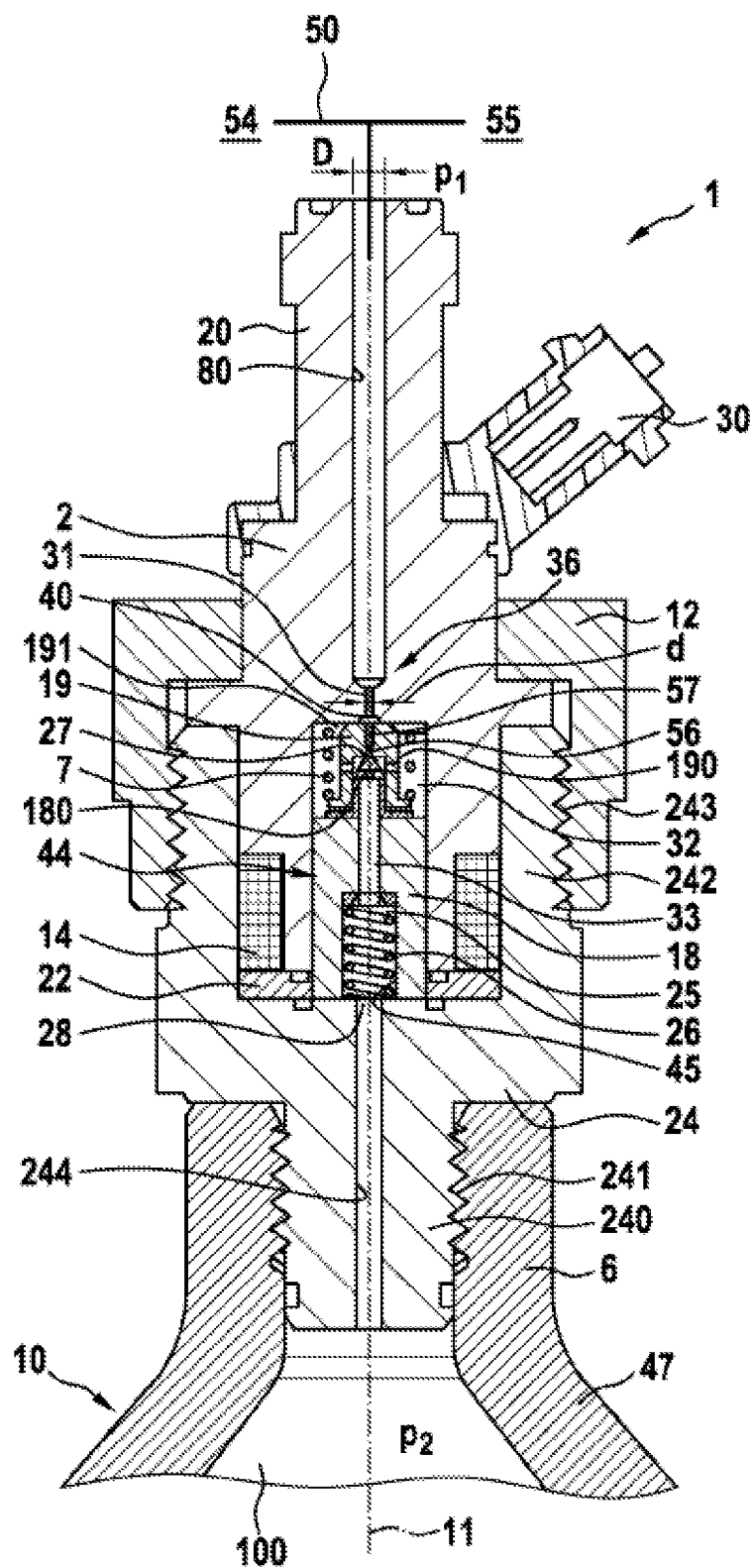

TANK DEVICE FOR STORING A GASEOUS MEDIUM

BACKGROUND

The invention relates to a tank device for storing a gaseous medium, in particular for storing hydrogen, for example for use in vehicles having a fuel cell drive or in vehicles having a hydrogen burner as the drive.

DE 10 2018 201 055 A1 describes a tank device having at least one storage unit, which comprises a control valve and which is connected via a line system to an output line. At least one control valve of at least one storage unit is thereby designed as a main valve, and at least one control valve of at least one storage unit is designed as a secondary valve, wherein the main valve and the secondary valve are designed differently.

The safety devices for such a tank device are standardized. In this context, every tank device must comprise a shutoff valve. So, in the event of damage to the tank device caused by an accident involving the vehicle having a fuel cell drive, or if a line of the tank device ruptures, the shutoff valve can seal the tank so that no gas can escape from the tank device.

Due to the high safety requirements for the shutoff valves and due to high system pressures of, e.g., 800 bar or more, such shutoff valves are very challenging in terms of their structure and require a large amount of installation space. This in turn increases the overall weight of the tank device as a whole, which, in the event of an accident involving the vehicle having a fuel cell drive, can lead to the occurrence of high acceleration forces and possible deformations of the valve device or tank device.

SUMMARY

In contrast, the advantage of the tank device according to the invention is that a tank device with a compact design and comprising a safety valve featuring energy efficiency and compliance with all of the relevant safety criteria is provided in a structurally straightforward manner.

For this purpose, the tank device for storing a gaseous medium, in particular hydrogen, comprises a valve device, a tank, and a longitudinal axis. The valve device further comprises a valve housing, which valve housing which is equipped with pilot valve element that can be moved along a longitudinal axis of the tank device. The pilot valve element interacts with a first valve seat in order to open and close an outlet opening and thus forms a pilot valve. Furthermore, the valve device can be controlled by means of a solenoid coil. A main valve element is arranged in the valve housing, said main valve element interacts with a second valve seat in order to open and close an outlet opening and thus forms a main valve. The tank device further comprises a screw-in housing element, wherein the valve device is integrated into a neck region of the tank in a fixed manner by means of the screw-in housing element. Moreover, the valve device is arranged in the tank by means of a tank pressure and is in a closed position when the solenoid coil is deactivated.

In this way, a compactly constructed dual shift shut off valve can be achieved that meets safety requirements due to its integrated design and achieves cost savings. In addition, especially when the solenoid coil is deactivated, it is ensured that no gaseous medium, in particular hydrogen, can escape from the tank via the valve device because the pilot valve element is pushed onto the valve seat due to the pressure differential between the tank and the through-channel and the force of the spring.

Furthermore, the structural design of arranging the valve device outside the tank (and the reduced pressure application surface thereby) results in significantly smaller axial compressive forces. These smaller pressure application surfaces at high pressures significantly reduce component loads, which is reflected in lower deformations, wear, and sealing conditions, thus achieving a higher service life for the tank device.

In the first advantageous embodiment, it is provided that the screw-in housing element comprises a shaped piece having a first thread and a cup-shaped end having a second thread.

In a further embodiment of the invention, it is advantageously provided that a through-passage is formed in the screw-in housing element, via which through-passage the tank is connected to the valve device. Doing so leads to a higher robustness of the entire tank, especially in the event of an accident.

In one advantageous embodiment, it is provided that the second valve seat is formed downstream of the valve housing and at the outlet opening and that the cylindrical outlet opening opens into a cylindrical through-channel, wherein a diameter D of the through-channel is greater than a diameter d of the outlet opening. In this way, a force towards the closed position of the valve device is applied to the valve device by the corresponding pressure ratios.

In a further embodiment of the invention, it is advantageously provided that the through-channel transitions into the outlet opening by way of a conical transition region.

In an advantageous further development, the tank device comprises a fixing element, by means of which fixing element the valve device securely connects to the screw-in housing element, and the valve device is then fixed to the screw-in housing element.

In a further configuration of the invention, it is advantageously provided that the through-channel can be connected to a tank interior space by way of an inlet opening formed in the valve housing and a through-passage of the screw-in housing element. The cross-section of gaseous medium flow coming from the tank is thus easily controllable.

One advantageous further development provides that the spring is arranged in a recess of the pilot valve element and a spring chamber is formed, said spring applying a force to the pilot valve element and the main valve element in the direction of the valve seat. It can in this way be ensured that the pilot valve element is pushed onto the valve seat by means of the force of the spring and the pressure differential between the tank and the through-passage. When the solenoid coil is not energized, the tightness of the valve device is thus ensured.

In a further embodiment of the invention, it is advantageously provided that the pilot valve element comprises a longitudinal opening and a transverse bore, which longitudinal opening and which transverse bore are fluidically connected to the spring chamber. The gaseous medium can then be optimally guided through the valve device.

In an advantageous embodiment, a control chamber is formed between the valve housing and the main valve element, in which control chamber a spring is arranged, which spring applies a force to the main valve element in a direction opposite the second valve seat.

In a further configuration of the invention, it is advantageously provided that the main valve element comprises a drain channel, said drain channel opens into a passage opening, wherein the passage opening opens into the outlet opening.

In an advantageous embodiment, it is provided that the first valve seat is formed on the main valve element, and the second valve seat is formed on the valve body.

The tank device described herein is preferably suited for use in a fuel cell system for storing hydrogen for operating a fuel cell.

The tank device described herein for storing hydrogen for operating a fuel cell is furthermore advantageously suited for use in a fuel cell-powered vehicle.

The tank device described herein for storing hydrogen is furthermore advantageously suited for use in a hydrogen-powered vehicle, e.g., in a vehicle having a hydrogen burner as the drive.

BRIEF DESCRIPTION OF THE DRAWINGS

The drawing illustrates an embodiment example of a tank device according to the invention for storing a gaseous medium, in particular hydrogen. Here:

FIG. 1 shows a longitudinal section of an embodiment example of a tank device according to the invention having a valve device.

DETAILED DESCRIPTION

FIG. 1 shows an embodiment example of a tank device 1 according to the invention having a longitudinal axis 11 for a gaseous medium. The tank device 1 comprises a tank 10 and a valve device 2. The tank 10 comprises a tank housing 47, in which a tank interior 100 is formed. The tank housing 47 further comprises a neck region 6 into which the valve device 2 is integrated by means of a screw-in housing element 24.

Attached to the neck region 6 is a connection point in the form of a thread, so that the valve device 2 can be screwed into the tank 10 by means of the screw-in housing element 24. Furthermore, a fixing element 12 is provided which securely connects the valve device 2 and the screw-in housing element 24 to each other, e.g., by means of a screw connection.

The screw-in housing element 24 comprises a shaped piece 240, on which a first thread 241 is formed so that the latter can be easily introduced into the neck region 6 of the tank 10. The screw-in housing element 24 further comprises a cup-shaped end 242, in which the valve device 2 is received. The cup-shaped end 242 further comprises a second thread 243, to which the fixing element 12 can be screwed when fixing the valve device 2 onto the screw-in housing element 24.

A through-passage 244 is formed in the screw-in housing element 24 so that a gaseous medium, in particular hydrogen, can be conveyed from the tank interior 100 via a cylindrical through-channel 80, e.g., in this manner to a fuel cell anode region in a fuel cell arrangement via the valve device 2.

The valve device 2 comprises a valve housing 20, in which a cylindrical inlet opening 28 is formed, wherein the inlet opening 28 opens into the through-passage 244 of the screw-in housing element 24. Both the flow into and out of the valve device 2 runs in a direction axial to the longitudinal axis 11 of the tank device 1.

Furthermore, a solenoid coil 14 is received and integrated into the valve housing 20, wherein the solenoid coil 14 is fixed in the valve housing 20 by means of a support element 22, and sealed against an internal region of the valve device 2 by means of sealing elements on the support element 22. The solenoid coil 14 can be controlled via an electrical connection 30.

A pilot valve element 18 that can be moved along the longitudinal axis 11 is arranged in the valve housing 20. The pilot valve element 18 comprises a recess 45, in which a spring chamber 25 is formed. A spring 26 is arranged within this spring chamber 25. The pilot valve element 18 further comprises a longitudinal opening 33 and a transverse bore 180, which are fluidically connected to the spring chamber 25. The spring chamber 25 also opens into the inlet opening 28.

In addition, a main valve element 19 is arranged in the valve device 2 in a direction coaxial to the pilot valve element 18, wherein the main valve element 19 partially surrounds the pilot valve element 18. A transverse bore 190 is formed in the main valve element 19, which bore opens into the transverse bore 180 of the pilot valve element 18. The main valve element 19 further comprises a first outlet opening 56, which opens into an passage opening 57. The latter in turn opens into a second outlet opening 31.

A first valve seat 27 is formed on the main valve element 19, which first valve seat interacts with the pilot valve element 18 in order to open and close the first outlet opening 56 and thus forming a pilot valve 44.

A second valve seat 40 is formed on the valve housing 20, which second valve seat interacts with the main valve element 19 in order to open and close the second outlet opening 31 and thus forms a main valve 191. In addition, the second valve seat 40 is formed downstream of the valve housing 20 and the second outlet opening 31.

A control chamber 32 is formed between the valve housing 20 and the main valve element 19, in which chamber a spring 7 is arranged, which spring applies a force to the main valve element 19 in a direction opposite the second valve seat 40.

The spring 26 in the spring chamber 25 acts on the pilot valve element 18 and the main valve element 16 with a force in the direction of the second valve seat 40. In addition, the spring 26 is supported on the screw-in housing element 24 on the one hand and on the pilot valve element 18 on the other hand.

The through-channel 80 opens into the second outlet opening 31 by way of a conical transition region 36, wherein the through-channel 80 has a diameter D, and the second outlet opening 31 has a diameter d. The diameter D of the through-channel 80 is greater than the diameter d of the second outlet opening 31.

The valve housing 20 is in this case designed in a multipart manner, so that the solenoid coil 14 is received and integrated between the multipart valve housing 20. Furthermore, the valve device 2 can be controlled by means of the solenoid coil 14.

Moreover, a pressure $p_2$ in the tank 10 is greater than a pressure $p_1$ in the through-channel 80 so that, in addition to the force of the spring 26, a further closing force acts on the pilot valve element 18 and the main valve element 19, and the valve device 1 is arranged in a closed position when the solenoid coil 14 is de-energized.

The valve device 2 operates in the following manner: When energized, a magnetic field forms in the solenoid coil 14, which results in a force between the screw-in housing element 24 and the pilot valve element 18. A magnetic force is thereby generated on the pilot valve element 18, which force is opposite to the force of the spring 26 and the compressive forces generated by the gaseous medium. If the solenoid force is sufficient, then the pilot valve element 18 lifts away from the first valve seat 27 and releases an opening cross section between the inlet opening 28 and the through-channel 80. The gaseous medium then flows from the tank interior 100 via the inlet opening 28, the spring chamber 25, the longitudinal opening 33, the drain channel 56, and the passage opening 57 into the through-channel 80 via an inflow line 50 towards an inflow region 55 of a consumer system, e.g., towards an anode region of a fuel cell assembly.

The result is the through-channel 80 filling with gaseous medium, and the pressure system developing a stabilizing pressure level around the main valve element 19. Over time, a pressure level will adjust which is comparable to the pressure level at the pilot valve element 18. The pressure balance of the main valve element 19 lifts the latter away from the second valve seat 40 by the force of the spring 7, thus opening the large opening cross-section, which is a connection between the main opening 28 and the control chamber 32. The gaseous medium then also flows from the tank interior 100 via the second valve seat 40, then via the inlet opening 28, the spring chamber 25, the longitudinal opening 33, the transverse bore 180 of the pilot valve element 18, the transverse bore 190 of the main valve element 19 and via the control chamber 32 into the through-channel 80 via the inflow line 50 and towards the inflow region 53 of a consumer system, e.g., towards an anode region of a fuel cell arrangement.

If the energizing of the solenoid coil 14 is interrupted, the magnetic field collapses, a closing force is applied to the pilot valve element 18, and the main valve element 19 by the spring 26 and the pneumatic pressure ratios in the valve device 2. The pilot valve element 18 and the main valve element 19 thereby again move towards the first valve seat 27 and the second valve seat 40, thus again sealing the opening cross sections at the first valve seat 27 and the second valve seat 40. The gaseous medium then no longer flows out of the tank device 1 via the valve device 2 and towards the inflow region 53.

The self-closing concept of the valve device 2 also acts in an emergency, e.g., if the power supply is interrupted. It can thus be ensured that the hydrogen is trapped in the tank device 1 and is not discharged to the environment in an uncontrolled manner.

When filling the tank 10 with gaseous medium (in this case hydrogen), the direction of flow from an external filling means 54 runs via the inflow line 50 and the valve device 2 and towards the tank interior 100. Since the power must be shut off during the filling process, the valve device 2 must be designed such that pressure ratios present on the valve device 2 can be pushed against the valve device 2. During the filling process, given that the pressure in the through-channel 80 is greater than in the area of the main valve element 19, the pressure ratios must be designed such that the main valve element 19 can be pressed and opened against the force of the spring 26 and the pressure in the tank 10, so that the tank 10 can be filled with gaseous medium, e.g., hydrogen. Once the filling process is complete, equal pressure ratios are established in front of and behind the second valve seat 40, so that the valve device 2 is resealed via the force of the spring 26. The tank interior 100 can thus be filled with hydrogen via the inflow line 50, which is in this case then connected to an external filling means 54 via the same valve device 2 as the hydrogen is provided to the supply system.

The tank device 1 for storing a gaseous medium can be used not only in fuel cell-powered vehicles, but also for, e.g., hydrogen storage in vehicles having a hydrogen burner as the drive.

What is claimed is:

1. A tank device (1) for storing a gaseous medium, comprising a valve device (2), and a tank (10), and having a longitudinal axis (11), wherein the valve device (2) has a valve housing (20), wherein the valve housing (20) is equipped with a pilot valve element (18) that can be moved along the longitudinal axis (11), the pilot valve element (18) interacting with a first valve seat (27) to open and close a first outlet opening (56) and thus forming a pilot valve (44), wherein the valve device (2) can be controlled by a solenoid coil (14), wherein a main valve element (19) is arranged in the valve housing (20) in a direction coaxial to the pilot valve element (18), said main valve element (19) interacting with a second valve seat (40) to open and close a second outlet opening (31) and thus forming a main valve (191), wherein the tank device (1) comprises a screw-in housing element (24), wherein the valve device (2) is coupled to a neck region (6) of the tank (10) in a fixed manner by the screw-in housing element (24), and wherein the valve device (2) is arranged outside the tank (10) and is axially spaced from the neck region (6) and is in a closed position when the solenoid coil (14) is deactivated.

2. The tank device (1) according to claim 1, wherein the screw-in housing element (24) comprises a shaped piece (240) having a first thread (241) and a cup-shaped end (242) having a second thread (243).

3. The tank device (1) according to claim 1, wherein a through-passage (244) is formed in the screw-in housing element (24), wherein the tank (10) is connected to the valve device (2) via the through-passage (244).

4. The tank device (1) according to claim 1, wherein the second valve seat (40) is formed downstream on the valve housing (20) and at the second outlet opening (31), and the second outlet opening (31) opens into a cylindrical through-channel (80), wherein a diameter D of the cylindrical through-channel (80) is greater than a diameter d of the second outlet opening (31).

5. The tank device (1) according to claim 4, wherein the cylindrical through-channel (80) transitions into the second outlet opening (31) by way of a conical transition region (36).

6. The tank device (1) according to claim 1, wherein the tank device (1) comprises a fixing element (12), wherein the valve device (2) is connected to the screw-in housing element (24) by the fixing element (12) in a fixed manner, and the valve device (2) is thus fixed to the screw-in housing element (24).

7. The tank device (1) according to claim 4, wherein the cylindrical through-channel (80) can be connected to a tank interior space (100) by an inlet opening (28) formed in the valve housing (20) and a through-passage (244) of the screw-in housing element (24).

8. The tank device (1) according to claim 1, wherein a spring (26) is arranged in a recess (45) of the pilot valve element (18) and a spring chamber (25) is formed, wherein the spring (26), the pilot valve element (18), and the main valve element (16) are acted on by a force in a direction of the second valve seat (40).

9. The tank device (1) according to claim 8, wherein the pilot valve element (18) comprises a longitudinal opening (33) and a transverse bore (180), and wherein the longitudinal opening (33) and the transverse bore (180) are fluidically connected to the spring chamber (25).

10. The tank device (1) according to claim 1, wherein a control chamber (32) is formed between the valve housing (20) and the main valve element (19), wherein a spring (7) is arranged in the control chamber (32), the spring (7) applying a force to the main valve element (19) opposite a direction of the second valve seat (40).

11. The tank device (1) according to claim 1, wherein the main valve element (19) comprises a drain channel (56), wherein the drain channel (56) opens into a passage opening (57), wherein the passage opening (57) opens into the second outlet opening (31).

12. The tank device (1) according to claim 1, wherein the first valve seat (27) is formed on the main valve element (19), and the second valve seat (40) is formed on the valve housing (20).

13. A fuel cell system having the tank device (1) for storing hydrogen for operating a fuel cell according to claim 1.

14. A fuel cell-powered vehicle having the tank device (1) for storing hydrogen for operating a fuel cell according to claim 1.

15. A hydrogen powered vehicle having the tank device (1) for storing hydrogen according to claim 1.

16. The tank device (1) according to claim 1, wherein the gaseous medium is hydrogen.

17. The tank device (1) according to claim 1, wherein each of the pilot valve element (18) and the main valve element (19) are axially spaced from the neck region (6).

* * * * *